Aug. 17, 1943.  H. WILSON  2,326,813
MULTIPLE LAUNCHING OF PARACHUTE BORNE
EQUIPMENT CONTAINERS FROM AIRCRAFT
Filed April 18, 1942   2 Sheets-Sheet 1

INVENTOR
HARRY WILSON
BY
ATTORNEYS

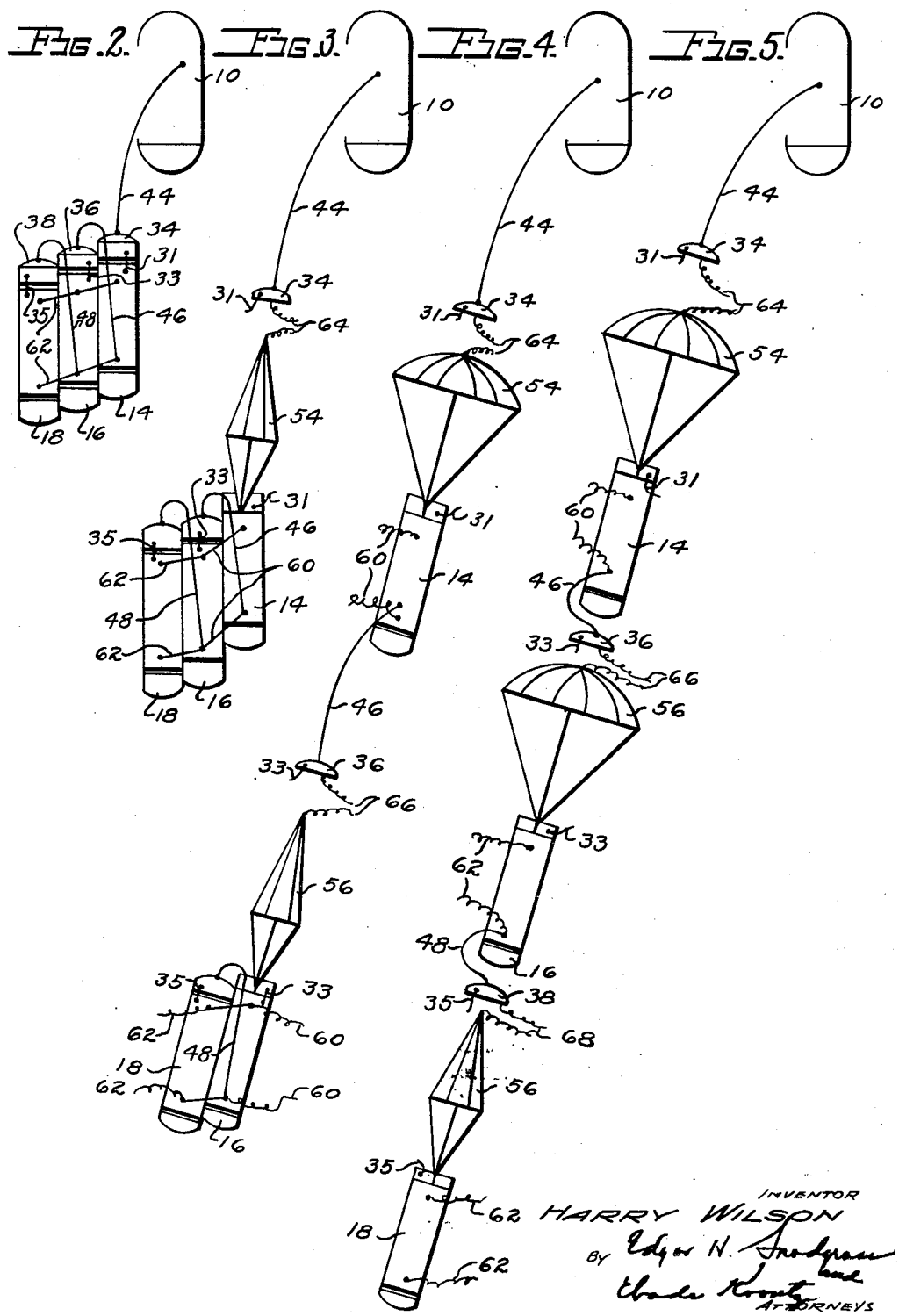

UNITED STATES PATENT OFFICE 2,326,813

MULTIPLE LAUNCHING OF PARACHUTE BORNE EQUIPMENT CONTAINERS FROM AIRCRAFT

Harry Wilson, Fort Benning, Ga.

Application April 18, 1942, Serial No. 439,450

5 Claims. (Cl. 244—137)

(Granted under the act of March 3, 1883, as amended April 30, 1928; 370 O. G. 757)

The invention described herein may be manufactured and used by or for Government for governmental purposes, without the payment to me of any royalty thereon.

This invention relates to parachute borne equipment containers and has special reference to a system of launching a plurality of containers simultaneously.

An object of the invention is to devise means whereby several containers may be launched simultaneously yet each will, in its order, separate itself from the others as its parachute opens, to the end that no entangling of the several units can result.

Other objects and advantages will be recognized as the following description is considered, reference being had to the drawings, wherein, Fig. 1 is a transverse section taken through the fuselage of an airplane where a side door is provided through which paratroops jump, showing several containers prepared for simultaneous ejection through the opened door.

Fig. 2 shows the apparatus just as the first static line tautens.

Fig. 3 shows the apparatus after the first static line has drawn the first parachute from its casing and has severed the break cord which connects the top of the first parachute's canopy to the inside of the first casing cover.

Fig. 4 shows the apparatus after the first parachute has opened, and the opening shock has drawn the second parachute from its casing and has severed the break cord which connects the top of the second parachute canopy to the inside of the second casing cover.

Fig. 5 shows the apparatus after the second parachute has opened, and the opening shock has drawn the third parachute from its casing and has severed the break cord which connects the top of the third parachute canopy to the inside of the third casing cover.

Figure 1:
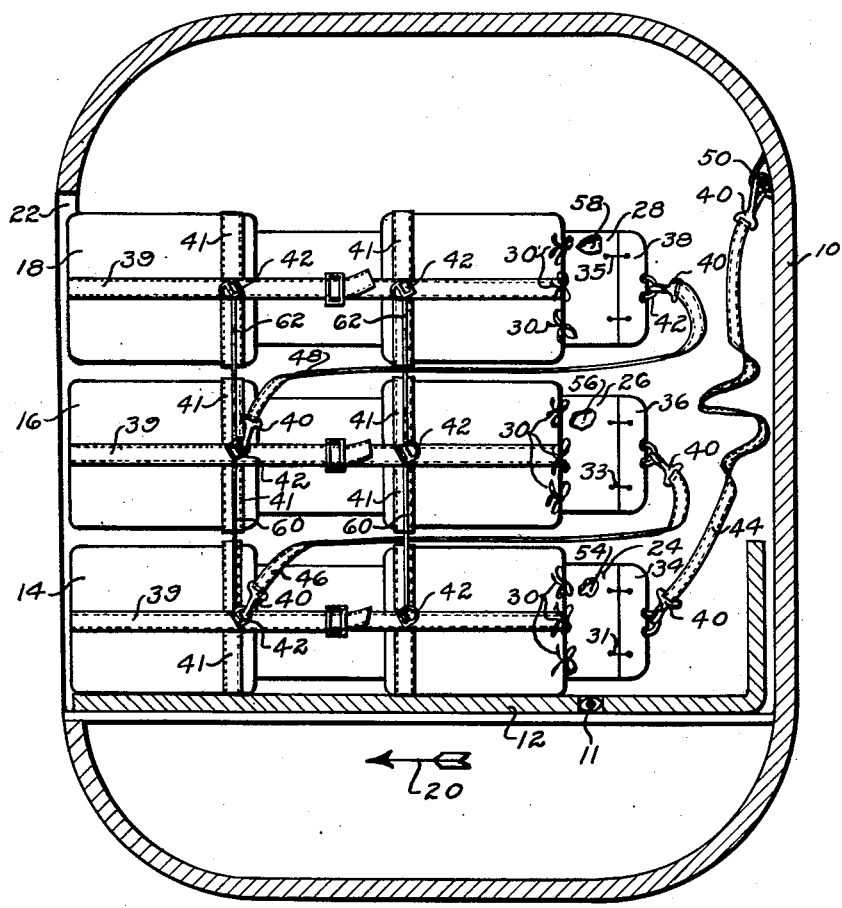

Referring particularly to Fig. 1, the fuselage 10 of an airplane has a launching slide 12 upon which a group of three containers 14, 16, and 18 are stacked one above the other. The slide 12 is movable in the direction of the arrow 20 to eject the three containers simultaneously through the doorway 22. A hinge 11 allows the extending end of the slide to drop when the hinge reaches the doorway.

The three containers 14, 16 and 18 have parachute packs 24, 26 and 28 respectively, attached to their tops by ties 30. Light break threads 31, 33, and 35 hold the removable tops 34, 36, and 38 of the packs in place pending their removal by the static lines 44, 46, and 48. The static lines have snap fasteners 40 at their ends for connection into D rings 42 which are secured to the container where the longitudinal straps 39 and the transverse straps 41 cross and to the tops 34, 36 and 38 of the parachute.

One end of the static line 44 is connected to the removable top 34, the other end being connected to the anchor rod 50 which is carried on the inside wall of the fuselage 10. One end of the static line 46 is connected to the removable top 36, the other end being connected to the D ring 42 near the lower end of the container 14. One end of the static line 48 is connected to the removable top 38, the other end being connected to the D ring near the lower end of the container 16.

Within the packs 24, 26, and 28, the parachute canopies 54, 56, and 58 respectively, are folded in the usual manner, the top centers of the canopies are secured to the inside top surfaces of the removable top covers 34, 36, and 38 by break threads 64, 66, and 68 (break threads not shown in Fig. 1). Light cords 60 and 62 hold the several containers together so that they must fall side by side until it becomes desirable for one to move ahead of another.

The operation of the device may best be described by reference to Figs. 2 to 5, inclusive.

With three containers stacked and connected as in Fig. 1, the launching device 12 is moved left, as indicated by the arrow 20, until the three containers start to fall side by side. When the static line 44 tautens as shown in Fig. 2, the light break thread 31 is first to yield, the top 34 remaining on the static line 44 while the three containers still remain together, pulling the canopy 54 out of the pack and severing the break thread 64 at which time the canopy 54 opens as shown in Fig. 4.

The shock incident to the opening of the canopy 54 as in Fig. 4, breaks the cords 60, which have thus far kept the container 14 falling with 16 and 18, after which 16 and 18 move ahead of 14 until the static line 46 tautens, breaking the thread 33 of the pack on the container 16, pulling out the canopy 56 and breaking the break cord 66, at which time the canopy 56 opens as shown in Fig. 5.

The shock incident to the opening of the canopy 56 as in Fig. 5 breaks the cords 62, which have thus far kept the container 16 falling with 18, after which 18 moves ahead of 16 until the static line 48 tautens, breaking the thread 35 of the pack on the container 18, pulling out the canopy 58 thus breaking the break cord 68 after which the canopy 58 will open and the three containers descend separately, each with its own parachute.

That the device has many advantages is obvious.

First, the amount of forward travel of the aircraft used for the departure of each of the paratroopers is considerable, and often results in scattering the landed troopers more widely than is desirable, and, since the three containers in the herein described system are landed in the space required for landing a single trooper, there is the advantage of landing the equipment in a more concentrated area.

Second, the fact that only one of the three parachutes opens close to the aircraft lessens the danger of fouling.

Third, the time in which equipment may be gotten to landed paratroops is important, since they may need it for immediate action and where each equipment container must be prepared for landing, then be ejected separately, the additional time consumed greatly exceeds that used by the herein described system.

Fourth, ejection chutes take space in an aircraft and since, with the herein disclosed system, only one such chute is required, considerable space is conserved.

While in the embodiment shown, a certain form of parachute pack is shown wherein the caps 34, 36, etc. remain on the static line, and the break cords connect the tops of the canopies to the insides of the caps, it will be understood that other forms of packs may be used, such as the purse type, which opens and allows the static line to pull the canopy from the pack through the opening, the static line being in that case connected by break cord directly to the canopy.

Having described an embodiment of my invention, I claim:

1. Apparatus for landing paratroop equipment from an aircraft, which comprises, in combination, a plurality of containers, a parachute pack secured to each container, a parachute canopy in each pack, a static line attached by a break cord to the top of each canopy, the static line from the top of the first canopy being connected to a place on the aircraft, the static line from the top of the second canopy being connected to the body of the first container, the static line from the top of the third canopy being connected to the body of the second container, etc.

2. Apparatus for landing paratroop equipment from an aircraft, which comprises, in combination, a series of containers, an equal number of parachute packs, one fastened to each container, a parachute canopy in each pack, a break cord at the top of each canopy, a static line extending from the break cord on one container to an anchor on the aircraft, a static line extending from the body of said one container to the break cord of a second container, and a static line extending from the body of said second container to the break cord of a third container and so uniformly throughout the series.

3. Apparatus for landing paratroop equipment from an aircraft, which comprises, in combination, a series of containers, a like series of parachute packs, one secured to each container, a like series of parachute canopies, one in each pack, a like series of static lines secured by break cords, one to the top of each canopy, the canopy in the first pack on the first container having the outer end of its static line connected to the aircraft, and succeeding canopies of the series having the outer ends of their static lines connected to the body of the container next preceding in the series.

4. Apparatus for landing paratroop equipment from an aircraft, which comprises, in combination, a series of containers, an equal number of parachute packs, one fastened to each container, a parachute canopy in each pack, a static line secured by break cord to the top of each canopy, one canopy being connected by its static line to the aircraft, the remaining canopies being connected by their static lines one to the body of said one container and the remainder to the bodies of other containers of the series.

5. Apparatus for landing paratroop equipment from an aircraft, which comprises, in combination, a series of containers laid side by side and tied together by break cords to restrain relative longitudinal movement between the several containers, a like series of parachute packs, one secured to each container, a like series of parachute canopies, one in each pack, a like series of static lines secured by break cords, one to the top of each canopy, the canopy in the first pack which is on the first container having the outer end of its static line connected to the aircraft, and succeeding canopies of the series having the outer ends of their static lines connected to the body of the container which is next preceding in the series.

HARRY WILSON.